United States Patent
Georgin et al.

(10) Patent No.: US 12,049,215 B2
(45) Date of Patent: Jul. 30, 2024

(54) SYSTEMS AND METHODS TO DETECT SHUT OFF VALVE FAILURE FOR IMPROVED UNCOMMANDED BRAKING

(71) Applicant: GOODRICH CORPORATION, Charlotte, NC (US)

(72) Inventors: Marc Georgin, Dayton, OH (US); Paul R. Burte, Clayton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 406 days.

(21) Appl. No.: 17/470,929

(22) Filed: Sep. 9, 2021

(65) Prior Publication Data
US 2023/0074835 A1    Mar. 9, 2023

(51) Int. Cl.
| | |
|---|---|
| *B60T 8/88* | (2006.01) |
| *B60T 8/17* | (2006.01) |
| *B60T 8/171* | (2006.01) |
| *B60T 13/68* | (2006.01) |
| *B60T 17/22* | (2006.01) |

(52) U.S. Cl.
CPC ............ *B60T 8/885* (2013.01); *B60T 8/1703* (2013.01); *B60T 8/171* (2013.01); *B60T 13/686* (2013.01); *B60T 17/22* (2013.01); *B60T 2270/406* (2013.01); *B60T 2270/88* (2013.01)

(58) Field of Classification Search
CPC ........ B60T 8/885; B60T 8/1703; B60T 8/171; B60T 13/686; B60T 17/22; B60T 2270/406; B60T 2270/88
USPC .......................................................... 701/70
See application file for complete search history.

(56) References Cited

U.S. PATENT DOCUMENTS

| | | | | |
|---|---|---|---|---|
| 4,181,368 A | * | 1/1980 | Strom | B60T 8/74 303/15 |
| 4,522,450 A | * | 6/1985 | Heilhecker | B60T 13/14 303/2 |
| 4,708,406 A | * | 11/1987 | Takagi | B60T 8/90 477/196 |
| 5,777,218 A | * | 7/1998 | Salamat | B60T 8/1703 73/132 |
| 6,820,946 B2 | * | 11/2004 | Salamat | B60T 8/1703 303/DIG. 9 |

(Continued)

OTHER PUBLICATIONS

European Patent Office, European Search Report dated Feb. 2, 2023 in Application No. 22190601.9.

*Primary Examiner* — Logan M Kraft
*Assistant Examiner* — John D Bailey
(74) *Attorney, Agent, or Firm* — SNELL & WILMER L.L.P.

(57) ABSTRACT

Systems and methods for shut off valve failure detection are provided. The system may comprise a housing, a shut off valve disposed within the housing, a first servovalve and a second servovalve coupled to the housing, and a pressure sensor disposed within the housing in fluid communication with the shut off valve. A controller may receive a pressure signal from the pressure sensor in the system, and a brake signal from a brake input device. The controller may determine whether there has been a shut off valve failure in the system in response to the pressure signal being greater than a pressure threshold and the controller failing to receive the brake signal, for a threshold period. The controller may then send a signal to a notification system in response to detection of the shut off valve failure and output a shut off valve failure notification.

16 Claims, 7 Drawing Sheets

(56) References Cited

U.S. PATENT DOCUMENTS

| | | | | |
|---|---|---|---|---|
| 8,118,256 B2* | 2/2012 | Cahill | | B60T 8/00 60/403 |
| 8,315,772 B2* | 11/2012 | Wagner | | B60T 8/3275 477/182 |
| 8,332,114 B2* | 12/2012 | Whittingham | | B60T 8/1703 701/119 |
| 9,017,220 B2* | 4/2015 | Richter | | B60W 10/18 477/186 |
| 10,525,961 B2* | 1/2020 | Ramirez Leano | | B60T 17/222 |
| 10,723,337 B2* | 7/2020 | Burte | | B60T 13/68 |
| 11,548,625 B2* | 1/2023 | Arsenault | | B64C 25/44 |
| 2004/0239173 A1* | 12/2004 | Williams | | B60T 8/325 303/3 |
| 2007/0108837 A1* | 5/2007 | Ohkubo | | B60T 8/90 303/122.08 |
| 2008/0234909 A1* | 9/2008 | Iwasaki | | B62D 5/065 701/70 |
| 2010/0057320 A1* | 3/2010 | Whittingham | | B60T 8/885 701/70 |
| 2010/0090058 A1* | 4/2010 | Cahill | | B60T 8/90 244/111 |
| 2011/0256000 A1* | 10/2011 | Fukui | | B64C 13/505 417/213 |
| 2014/0182381 A1* | 7/2014 | Comeaux | | F16K 37/0075 73/587 |
| 2018/0029567 A1* | 2/2018 | Cahill | | B60T 17/221 |
| 2018/0215357 A1* | 8/2018 | Cahill | | B60T 15/041 |
| 2019/0023253 A1* | 1/2019 | Cahill | | B60T 8/171 |
| 2019/0193708 A1* | 6/2019 | Kordik | | B60T 17/22 |
| 2019/0232937 A1 | 8/2019 | Georgin et al. | | |
| 2019/0322252 A1* | 10/2019 | Arsenault | | G01D 5/242 |
| 2020/0114894 A1* | 4/2020 | Leiber | | B60T 7/12 |
| 2020/0290580 A1* | 9/2020 | Georgin | | B60T 8/325 |
| 2020/0317327 A1* | 10/2020 | Arsenault | | B64C 25/44 |
| 2021/0086734 A1 | 3/2021 | Georgin | | |
| 2021/0179261 A1 | 6/2021 | Arsenault et al. | | |

* cited by examiner

SYSTEMS AND METHODS TO DETECT SHUT OFF VALVE FAILURE FOR IMPROVED UNCOMMANDED BRAKING

FIELD

The present disclosure relates generally to aircraft brake control systems and, more specifically, to systems and methods for detection of shut off valve failure within brake control valve modules.

BACKGROUND

Aircraft often include one or more landing gear that comprise one or more wheels. Wheels may comprise friction brakes which may be hydraulically operated to slow or stop the aircraft. Some servovalves provide hydraulic pressure based on proportional control signal. Other shut off valves provide simple open/closed functionality. Failure of a shut off valve can cause uncommanded braking of the aircraft.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

A brake control valve module (BCVM) is disclosed, comprising a housing, a shut off valve disposed within the housing, a first servovalve coupled to the housing, a pressure sensor disposed within the housing in fluid communication with the shut off valve, and the first servovalve. In various embodiments, the BCVM may be a dual brake control valve module (DBCVM) and it may comprise the first servovalve and a second servovalve. In various embodiments, the BCVM may comprise only one servovalve.

In various embodiments, the pressure sensor is at least one of a pressure transducer or a pressure switch. In various embodiments, the pressure sensor is configured to send a pressure signal to a brake control unit. In various embodiments, the pressure sensor is configured to measure a pressure of a pressurized fluid downstream of the shut off valve and upstream of the first servovalve.

In various embodiments, a supply port is coupled to the housing, and the supply port is configured to supply the pressurized fluid to the fluid plumbing system. In various embodiments, the return port is coupled to the housing, the return port is configured to return the pressurized fluid to a fluid supply, and the return port is in fluid communication with the shut off valve, and the first servovalve. In various embodiments, the return port is also in fluid communication with a second servovalve coupled to the housing. In various embodiments, a solenoid port is disposed on the housing, a solenoid is coupled to the housing at the solenoid port, and the solenoid is configured to receive the pressurized fluid from the supply port and is configured to supply the pressurized fluid to the shut off valve. In various embodiments, the shut off valve is configured to supply the pressurized fluid to the first servovalve in response to the shut off valve receiving the pressurized fluid from the solenoid. In various embodiments, the shut off valve may be configured to supply the pressurized fluid to the first servovalve and the second servovalve in response to the shut off valve receiving the pressurized fluid from the solenoid.

In various embodiments, the first servovalve is configured to supply the pressurized fluid to a first brake port coupled to the housing. In various embodiments, the second servovalve is configured to supply the pressurized fluid to a second brake port coupled to the housing. In various embodiments, a check valve is disposed within the housing, in fluid communication downstream of the shut off valve, the first servovalve and the solenoid, and upstream of the return port, and an inlet filter is disposed within the housing, in fluid communication upstream of the shut off valve and the solenoid and downstream of the supply port. The check valve may also be in fluid communication downstream of the second servovalve.

In various embodiments, the solenoid comprises an open position, wherein the solenoid is configured to supply the pressurized fluid to the shut off valve in response to the solenoid being in the open position, the solenoid comprises a closed position, wherein the solenoid is configured not to supply the pressurized fluid to the shut off valve in response to the solenoid being in the closed position, the solenoid is configured to remain in the closed position, and the solenoid is configured to transition from the closed position to the open position in response to an electric signal from the brake control unit.

A method of detecting a shut off valve failure is disclosed, comprising receiving, by a controller, a pressure signal from a pressure sensor in a brake control valve module, and a brake signal from a brake input device, wherein the brake control valve module comprises: a housing, a shut off valve disposed within the housing, a first servovalve coupled to the housing, and the pressure sensor disposed within the housing in fluid communication with the shut off valve, and the first servovalve; determining, by the controller, the shut off valve failure in the brake control valve module in response to the pressure signal being greater than a pressure threshold and the controller not receiving the brake signal for a threshold period; and sending, by the controller, an alert signal to an emergency notification system in response to detection of the shut off valve failure.

In various embodiments, the pressure sensor is configured to transmit the pressure signal to the controller every 2.5 milliseconds to 100 milliseconds, and wherein the brake input device is configured to transmit the brake signal in response to the brake input device being engaged. In various embodiments, the pressure sensor is a pressure transducer or a pressure switch. In various embodiments, the threshold period is between 100 milliseconds and 2 seconds. In various embodiments, the pressure threshold is between 1000 to 2000 kilopascals (kPa).

A brake control system (BCS) is disclosed, comprising: a brake control valve module, comprising: a housing, a shut off valve disposed within the housing, a first servovalve coupled to the housing, and a pressure sensor disposed within the housing in fluid communication with the shut off valve, and the first servovalve; a fluid supply, configured to supply a pressurized fluid to the brake control valve module; and a brake control unit configured to receive a pressure signal from the pressure sensor. In various embodiments, the pressure sensor is configured to measure a pressure of a pressurized fluid downstream of the shut off valve and upstream of the first servovalve. In various embodiments, the pressure sensor is a pressure transducer or a pressure switch.

BRIEF DESCRIPTION OF THE DRAWINGS

Various features will become apparent to those skilled in the art from the following detailed description of the disclosed, non-limiting, embodiments. The drawings that accompany the detailed description can be briefly described as follows.

DETAILED DESCRIPTION

Figure 1:
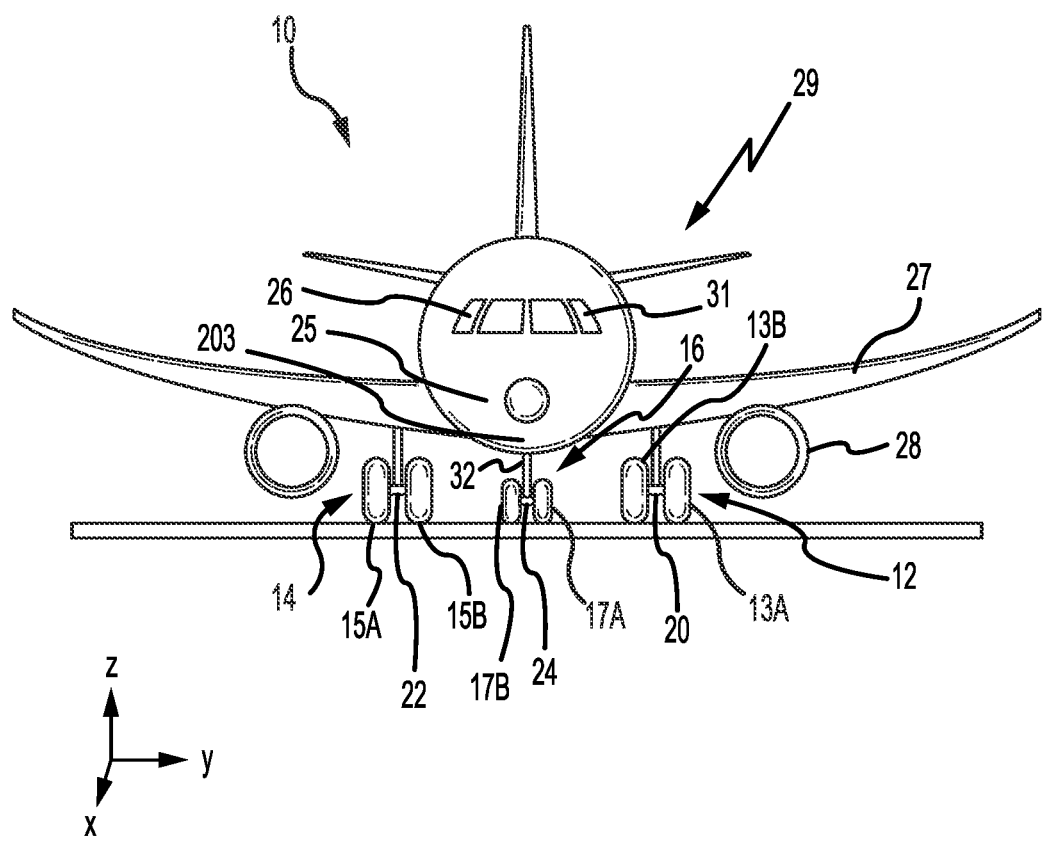
FIG. 1 illustrates a perspective view of an aircraft, in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling"). As used herein, "transmit" may include sending electronic data from one system component to another via electronic communication between the components. Additionally, as used herein, "electronic data" may include encompassing information such as commands, queries, files, data for storage, and the like in digital or any other form.

Often, a brake control valve module may comprise a shut off valve. Typically, the shut off valve remains in a closed position to prevent hydraulic brake fluid from passing through the shut off valve. The shut off valve is designed to open in response to a brake signal from a brake input device which causes the hydraulic brake fluid to pass through the shut off valve and activate braking. Unfortunately, the shut off valve can fail and remain stuck in an open position. If the shut off valve is stuck open, and a first servovalve or a second servovalve in the brake control valve module also fails, then the aircraft can experience braking without a braking command from the brake input device, i.e., uncommanded braking. Such uncommanded braking during takeoff can cause a serious safety issue.

In various embodiments, a Brake Control System ("BCS") is provided having one or more Line Replaceable Units ("LRUs"). A LRU may be configured to detect shut off valve failure within the LRU. The LRU may be a Brake Control Valve Module (BCVM) or a Dual Brake Control Valve Module (DBCVM). A BCVM may comprise a first brake port, a first servovalve, a supply port, a return port, a shut off valve and a solenoid. A DBCVM may comprise the first brake port, a second brake port, the first servovalve, the second servovalve, a supply port, a return port, a shut off valve and a solenoid. Various embodiments of the BCVM are configured to detect a failure of the shut off valve using a pressure sensor in fluid communication between the shut off valve, and a first servovalve. In various embodiments the pressurized fluid has a flow path from the shut off valve to the first servovalve. In various embodiments the pressure sensor may be downstream of the shut off valve, wherein downstream means along the flow path of the pressurized fluid passed the shut off valve. In various embodiments the pressure sensor may also be upstream of the first servovalve, wherein upstream means along the flow path of the pressurized fluid prior to the first servovalve. Various embodiments of a BCVM are intended to alert a notification system in response to detection of a shut off valve failure.

With reference to FIG. 1, an aircraft 10 in accordance with various embodiments may include landing gear such as landing gear 12, landing gear 14 and landing gear 16. Landing gear 12, landing gear 14 and landing gear 16 may generally support aircraft 10 when aircraft is not flying, allowing aircraft 10 to taxi, take off and land without damage. Landing gear 12 may include wheel 13A and wheel 13B coupled by an axle 20. Landing gear 14 may include wheel 15A and wheel 15B coupled by an axle 22. Landing gear 16 may include nose wheel 17A and nose wheel 17B coupled by an axle 24. The nose wheels differ from the main wheels in that the nose wheels may not include a brake and/or a wheel speed transducer. An XYZ axes is used in FIG. 1 to illustrate the axial (y), forward (x) and vertical (z) directions relative to axle 22.

Aircraft 10 may comprise Brake Control Unit (BCU) 25, cockpit controls 26, aerodynamic surfaces 27, propulsion system 28 and notification system 31. Landing gear 14, landing gear 16, and landing gear 12 may be in communication with BCU 25 and may receive commands from BCU 25, for example, to apply friction brakes. In various embodiments, the BCU is typically located in the fuselage of the aircraft. Wires may extend between the fuselage and the BCU at the location of the wheels. The BCU may receive signals or commands from cockpit controls, from sources external to the aircraft, or from any other suitable onboard sensors known to those skilled in the art. In various embodiments, BCU 25 may be in electronic communication with cockpit controls 26, a shut off valve 203, ground controls 32, notification system 31 and/or may be in electronic communication with external systems via external command signals 29 such as, for example, radio signals. The BCU 25 may transmit data or notifications to the notification system 31. The BCU 25 may control the shut off valve 203 in response to cockpit controls 26, ground controls 32, or external command signals 29. In various embodiments, the cockpit controls 26 may comprise a brake input device configured to transmit a brake signal in response to a pilot activating a brake input. Notification system 31 may be configured to output a notification, for example to the pilot, in response to data received from the BCU 25. The notification may be a shut off valve failure notification, such as displaying a message to the pilot when there is detection of a shut off valve failure.

The BCU 25 may receive feedback from the shut off valve 203 such as, for example, position feedback, electrical feedback, and/or any other suitable input data. In various embodiments, the feedback may be direct feedback or sensor feedback. The BCU 25 may control a solenoid to open the shut off valve 203 in response to the brake input signal and/or any other suitable input data. In various embodiments, the BCU 25 may be in electronic communication with the full suite of aircraft sensors and other data sources available within and without the aircraft such as, for example, GPS, radio beacons, remote commands and the like. In various embodiments, the BCU 25 may be in electronic communication with various sensors and components of a BCVM such as a pressure sensor. Sensors may provide aircraft speed, wheel speed, brake temperature, shut off valve pressure, landing gear position, pedal position, autobrake setting, thrust reverser position, throttle position, acceleration, aircraft flight phase, brake signal and any other suitable input data. The BCU 25 may coordinate the inputs of various sensors with internally stored data or configuration settings and may command the notification system to output a shut off valve failure in response to detection of a shut off valve failure.

Figure 2A:
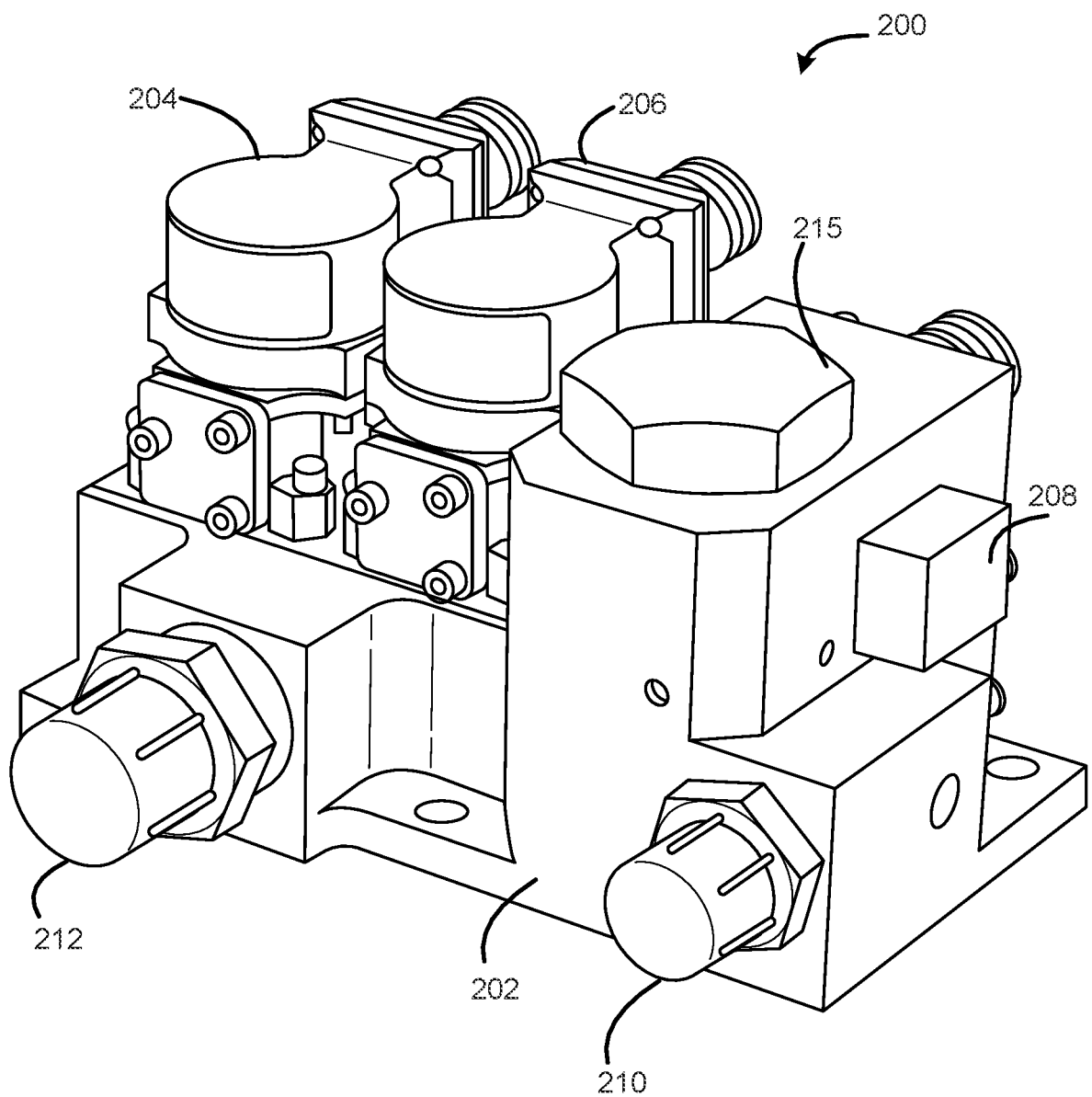
FIG. 2A illustrates a perspective view of a dual brake control valve module (DBCVM), in accordance with various embodiments.
Figure 2B:
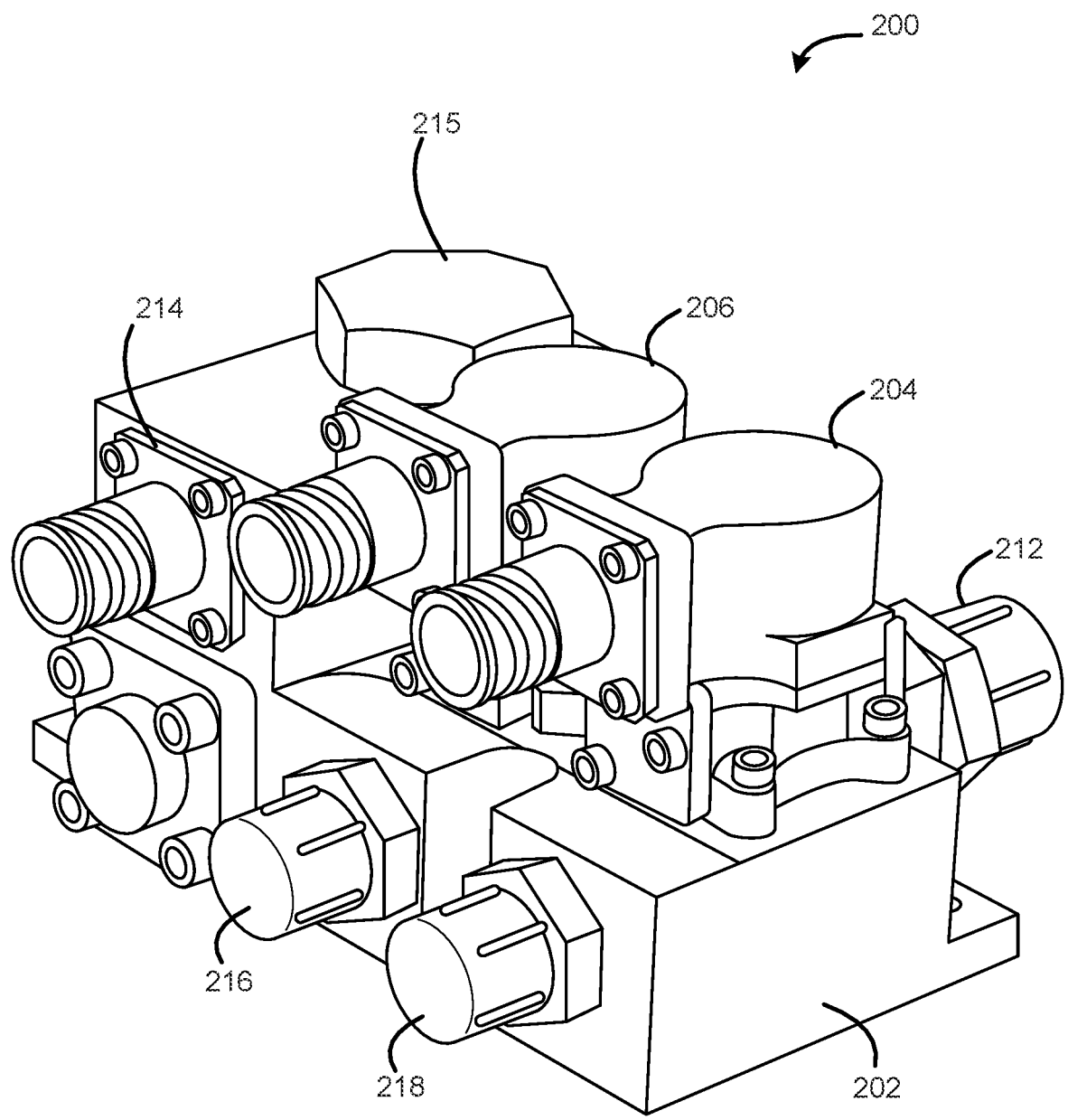
FIG. 2B illustrates a perspective view of the DBCVM, in accordance with various embodiments.
Figure 3:
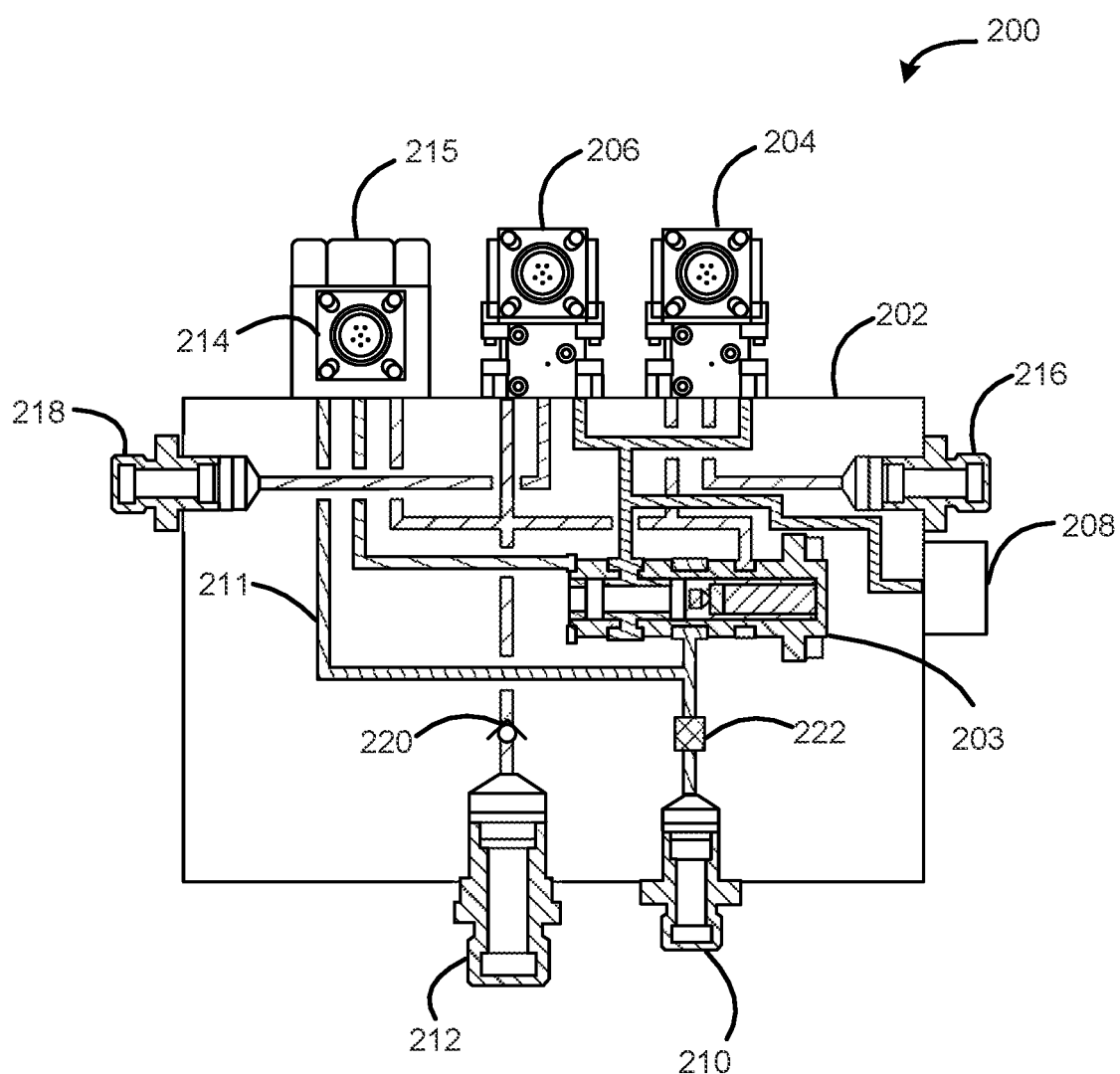
FIG. 3 illustrates a schematic view of the DBCVM, in accordance with various embodiments.

In various embodiments, and with additional reference to FIGS. 2A, 2B and 3, a dual brake control valve module (DBCVM) 200 in accordance with various embodiments may include a housing 202, a shut off valve 203 disposed within the housing 202, a first servovalve 204 and a second servovalve 206 coupled to the housing 202, a pressure sensor 208 coupled to the housing 202. In various embodiments, the pressure sensor 208 is in fluid communication with the shut off valve 203, the first servovalve 204 and the second servovalve 206. In various embodiments, a supply port 210 is coupled to the housing 202 and is configured to supply a pressurized fluid to a fluid plumbing system 211. In various embodiments, the pressurized fluid can be a hydraulic fluid or any other suitable fluid for a brake system.

In various embodiments, the pressure sensor 208 of DBCVM 200 may be a pressure transducer, a pressure switch or any suitable pressure measuring device. In embodiments where pressure sensor 208 is a pressure transducer, the pressure transducer may be of a strain-gage type, a capacitance type, a potentiometric type, and/or a resonant wire type. The pressure sensor 208 may also be configured to send a pressure signal to the BCU 25. The pressure sensor 208 may be configured to be downstream of the shut off valve 203, and upstream of the first servovalve 204 and the second servovalve 206. Placing the pressure sensor 208 in such an arrangement allows it to detect a pressure of the pressurized fluid as it flows from the shut off valve 203 to the first servovalve 204 and the second servovalve 206. The pressure signal corresponds to the pressure measured by the pressure sensor. The pressure sensor 208 may output a variable electrical signal indicative of the pressurized fluid, though in various embodiments the variable electrical signal is converted into a digital signal. In various embodiments, the pressure sensor 208 may be configured to output a binary signal indicative of whether the pressurized fluid is above or below a predetermined threshold pressure.

In various embodiments, pressure sensor 208 may be configured to be coupled to the housing 202, for example, mounted onto the housing 202, and in fluid communication with the shut off valve 203, first servovalve 204, and second servovalve 206. The pressure sensor 208 may be entirely disposed within the housing 202, and in fluid communication with the shut off valve 203, first servovalve 204, and second servovalve 206. In various embodiments, the pressure sensor 208 may be configured to be outside the housing 202, and not coupled to the housing 202, but remain in fluid communication with the shut off valve 203, first servovalve 204, and second servovalve 206.

In various embodiments, a return port 212 is coupled to the housing 202 and is configured to return the pressurized fluid to a fluid reservoir. In various embodiments, the return port 212 is in fluid communication with the shut off valve 203, the first servovalve 204, the second servovalve 206 and a solenoid 215. The return port may be configured to output any return of the pressurized fluid from the shut off valve 203, the first servovalve 204, the second servovalve 206 and the solenoid 215.

In various embodiments, a solenoid port 214 is coupled to the housing 202. The solenoid 215 may be coupled to the housing 202. In various embodiments, the solenoid 215 is in fluid communication with the supply port 210, the shut off valve 203, and the return port 212. The solenoid 215 may also be configured to receive the pressurized fluid from the supply port. In various embodiments, the solenoid 215 may also supply the pressurized fluid to the shut off valve 203. The solenoid 215 may supply a small amount of the pressurized fluid to the shut off valve 203. In various embodiments, the solenoid 215 only provides the small amount of the pressurized fluid to the shut off valve 203 in order to open the shut off valve 203.

In various embodiments, the solenoid is in electronic communication with the BCU 25. The solenoid 215 is configured to receive the brake signal from the BCU 25. The solenoid 215 may comprise an open position and a closed position. The solenoid 215 may be configured to supply the pressurized fluid to the shut off valve 203 in response to the solenoid 215 being in the open position. In various embodiments, solenoid 215 is configured to prevent the supply of pressurized fluid to the shut off valve in response to the solenoid being in the closed position. In various embodiments, the solenoid 215 remains in the closed position and transitions from the closed position to the open position upon receiving the brake signal from the BCU 25.

In various embodiments, the shut off valve 203 comprises a shut off valve open position and a shut off valve closed position. When in the shut off valve open position, the shut off valve 203 may be configured to supply the pressurized fluid to the first servovalve 204 and the second servovalve 206. When in the shut off valve closed position, the shut off valve 203 may be configured to prevent supply of the pressurized fluid to the first servovalve 204 and the second servovalve 206. In various embodiments, the shut off valve 203 remains in the shut off valve closed position and only transitions to the shut off valve open position in response to receiving the pressurized fluid from the solenoid 215.

In various embodiments, the first servovalve 204 is in fluid communication with a first brake port 218 coupled to the housing 202. The first servovalve 204 may be configured to supply the pressurized fluid to the first brake port 218. In various embodiments, the second servovalve 206 is in fluid communication with a second brake port 216 coupled to the housing 202. The second servovalve 206 may be configured to supply the pressurized fluid to the second brake port 216.

In various embodiments, a check valve 220 is disposed within the housing 202 and may be in fluid communication with the shut off valve 203, the first servovalve 204, the second servovalve 206, the solenoid 215 and the return port 212. The check valve 220 may be upstream of the return port 212 and downstream of the shut off valve 203, the first servovalve 204, the second servovalve 206 and the solenoid 215. In various embodiments, an inlet filter 222 is disposed within the housing 202 and may be in fluid communication with the shut off valve 203, the solenoid 215 and the supply port 210. The inlet filter 222 may be upstream of the shut off valve 203 and the solenoid 215, and downstream of the supply port 210.

Figure 4:
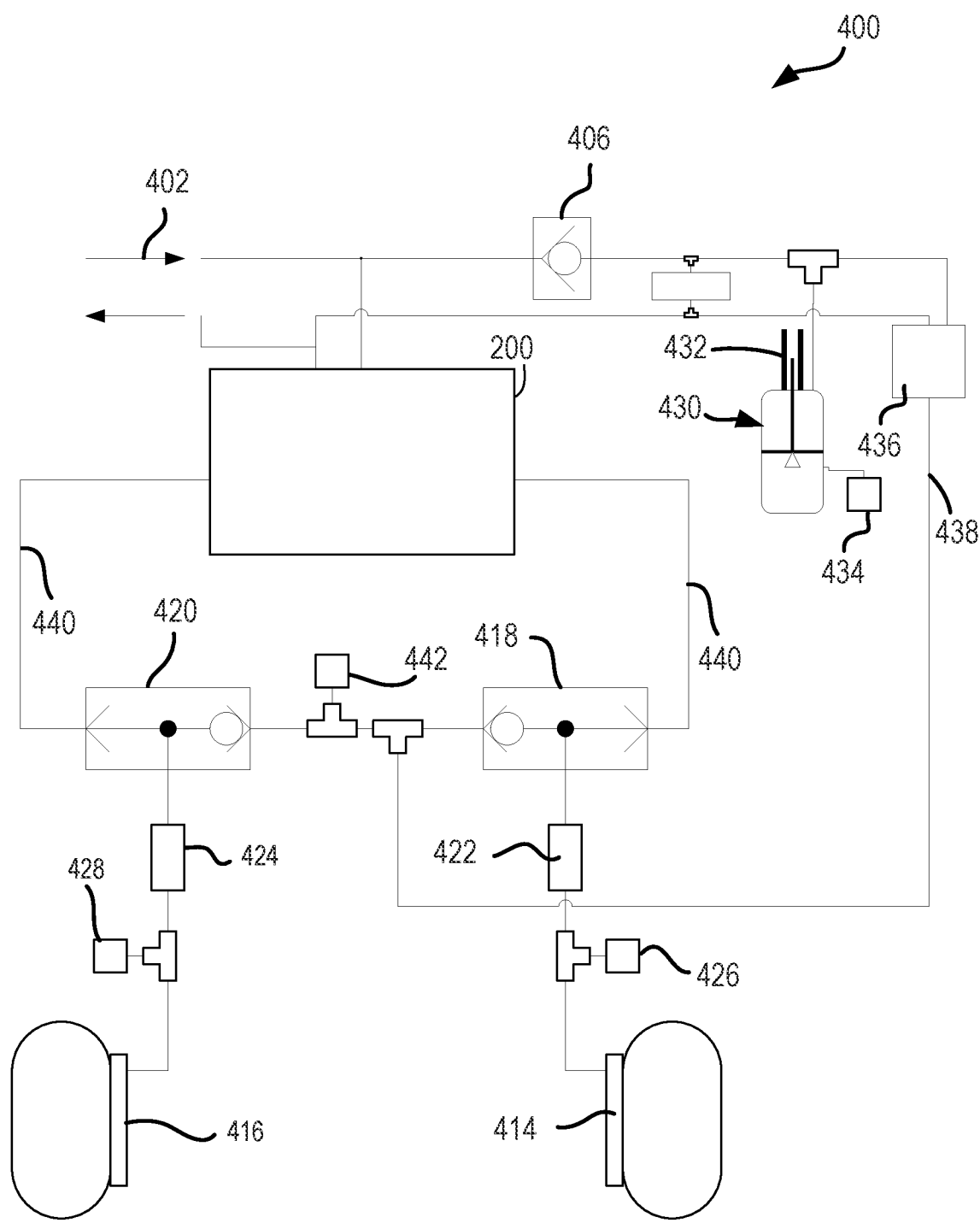
FIG. 4 illustrates a schematic view of a brake control system (BCS), in accordance with various embodiments.

In various embodiments and with additional reference to FIG. 4 a schematic diagram of a Brake Control System ("BCS") 400 including the DBCVM 200 is illustrated. DBCVM 200 is in fluid communication with a fluid supply 402. The fluid supply 402 may be configured to supply a pressurized fluid to the DBCVM 200. BCS 400 may include a DBCVM 200 comprising the shut off valve 203, a first servovalve 204 and a second servovalve 206. DBCVM 200 may further comprise a pressure sensor 208 disposed within the housing 202, and in fluid communication with the shut off valve 203, the first servovalve 204 and the second servovalve 206. In various embodiments the pressure sensor 208 is configured to measure a pressure of the pressurized fluid downstream of the shut off valve 203, and upstream of the first servovalve 204 and the second servovalve 206.

In various embodiments, DBCVM 200 may be in electronic communication with BCU 25 and each of the solenoid 215, the first servovalve 204 and the second servovalve 206 may be configured to be controlled by the BCU 25. The shut off valve 203 is configured to interrupt fluid communication between the fluid supply 402 and each of the first and second servovalves (204 and 206). The first servovalve 204 may be in fluid communication with a first friction brake assembly 414 via primary supply lines 440 thereby enabling pressure control of the respective friction brake. In like regard, the second servovalve 206 may be in fluid communication with a second friction brake assembly 416.

In various embodiments, a first shuttle valve 418 and a second shuttle valve 420 may be coupled to the primary supply lines 440 and each fed, respectively, by the first servovalve 204 and the second servovalve 206. The shuttle valves (418, 420) may be coupled to an emergency brake supply line 438 and configured to selectively receive hydraulic input pressure therefrom. The emergency brake supply line 438 may be in fluid communication with a park emergency valve 436 which may be in fluid communication with a hydraulic accumulator 430 and coupled to the BCS 400 in parallel with the DBCVM 200. In this regard, hydraulic accumulator 430 may be configured as an alternate supply of hydraulic pressure to the friction brake assemblies (414, 416) via the shuttle valves (418, 420) in response to opening the park emergency valve 436. In various embodiments, BCS 400 includes one or more sensors in electronic communication with BCU 25. For example, BCS 400 may include pressure transducers such as a first brake pressure transducer 426, a second brake pressure transducer 428, an emergency system pressure transducer 442, and an accumulator pressure transducer 434. BCS 400 may include fluid level sensors such as an accumulator level sensor 432 and/or the like. In various embodiments, BCS 400 may include one or more hydraulic fuses (422, 424) which may tend to limit a loss of hydraulic fluid in the event of damage to hydraulic system elements.

Figure 5:
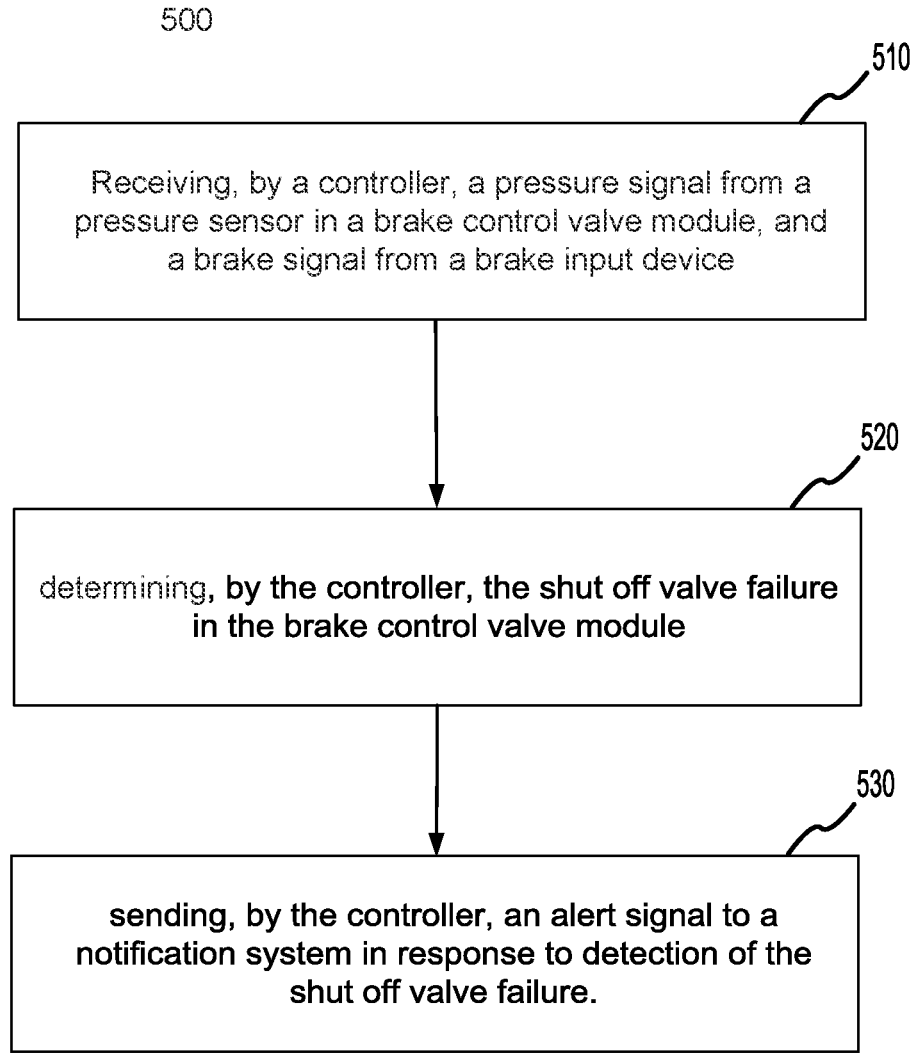
FIG. 5 illustrates a method for detecting shut off valve failure, in accordance with various embodiments.

With reference to FIG. 5, a method 500 for detecting a shut off valve failure is provided, in accordance with various embodiments. Method 500 includes receiving, by a controller, a pressure signal from a pressure sensor in a brake control valve module, and a brake signal from a brake input device (step 510). Method 500 includes determining, by the controller, a shut off valve failure in the brake control valve module (step 520). Method 500 includes sending, by the controller, an alert signal to a notification system in response to detection of the shut off valve failure.

With combined reference to FIG. 1, FIG. 3 and FIG. 5, step 510 may include receiving, by BCU 25, a pressure signal from a pressure sensor 208 in dual brake control valve module 200, and a brake signal from a brake input device in cockpit controls 26 (step 510). The brake control valve module may comprise housing 202, shut off valve 203 disposed within the housing 202, first servovalve 204 and second servovalve 206 coupled to the housing 202, and pressure sensor 208 disposed within the housing 202 in fluid communication with the shut off valve 203, the first servovalve 204, and the second servovalve 206.

In various embodiments, step 520 may include determining, by the BCU 25, the shut off valve failure in the brake control valve module 200, in response to the pressure signal being greater than a pressure threshold and the BCU 25 not receiving the brake signal for a threshold period. In various embodiments, the pressure sensor 208 is configured to transmit the pressure signal to the BCU 25 every 1 millisecond to 200 milliseconds, every 2.5 milliseconds to 100 milliseconds, or every 10 milliseconds to 50 milliseconds. In various embodiments, the threshold period is between 100 milliseconds to 2 seconds, between 300 milliseconds and 1.5 seconds, or between 400 milliseconds and 1 second. In various embodiments, the brake input device is configured to transmit the brake signal in response to the brake input device being engaged. In various embodiments the pressure threshold is a range between 1000 kilopascals (kPa) (145 psi) and 2000 kPa (290.1 psi), and preferably between 1250 kPa (181.2 psi) and 1750 kPa (253.8 psi). The pressure sensor may be a pressure transducer or a pressure switch. In various embodiments, step 530 may include sending, by the BCU 25, an alert signal to a notification system 31 in response to detection of the shut off valve failure.

Figure 6:
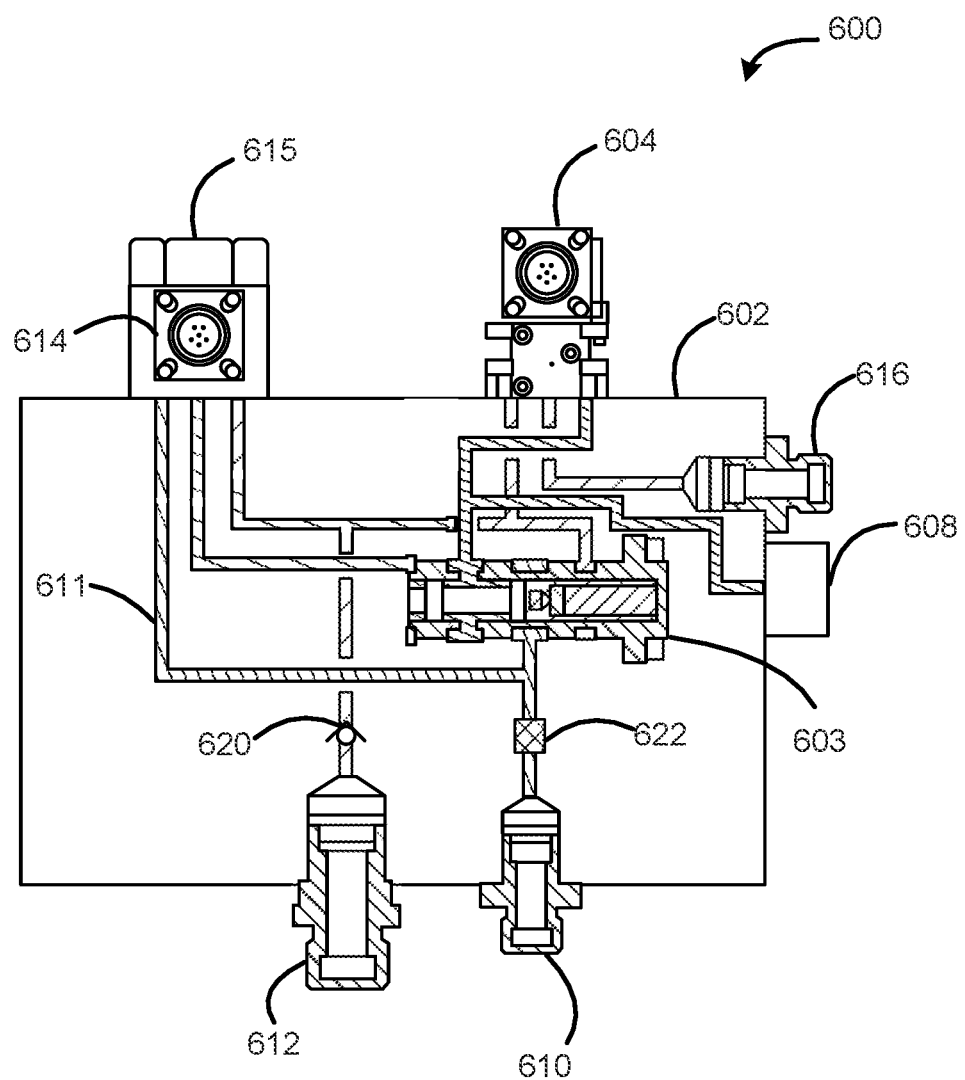
FIG. 6 illustrates a schematic view of a brake control valve module (BCVM), in accordance with various embodiments.

With reference to FIG. 6, a brake control valve module (BCVM) 600 in accordance with various embodiments may include a housing 602, a shut off valve 603 disposed within the housing 602, a first servovalve 604 coupled to the housing 602, a pressure sensor 608 coupled to the housing 602. In various embodiments, the pressure sensor 608 is in fluid communication with the shut off valve 603, and the first servovalve 604. In various embodiments, a supply port 610 is coupled to the housing 602 and is configured to supply a pressurized fluid to a fluid plumbing system 611. In various embodiments, the pressurized fluid can be a hydraulic fluid or any other suitable fluid for a brake system.

In various embodiments, the pressure sensor 608 of BCVM 600 may be a pressure transducer, a pressure switch or any suitable pressure measuring device. In embodiments where pressure sensor 608 is a pressure transducer, the pressure transducer may be of a strain-gage type, a capacitance type, a potentiometric type, and/or a resonant wire type. The pressure sensor 608 may also be configured to send a pressure signal to the BCU 25. The pressure sensor

608 may be configured to be downstream of the shut off valve 603, and upstream of the first servovalve 604. Placing the pressure sensor 608 in such an arrangement allows it to detect a pressure of the pressurized fluid as it flows from the shut off valve 603 to the first servovalve 604. The pressure signal corresponds to the pressure measured by the pressure sensor. The pressure sensor 608 may output a variable electrical signal indicative of the pressurized fluid, though in various embodiments the variable electrical signal is converted into a digital signal. In various embodiments, the pressure sensor 608 may be configured to output a binary signal indicative of whether the pressurized fluid is above or below a predetermined threshold pressure.

In various embodiments, pressure sensor 608 may be configured to be coupled to the housing 602, for example, mounted onto the housing 602, and in fluid communication with the shut off valve 603, and first servovalve 604. The pressure sensor 608 may be entirely disposed within the housing 602, and in fluid communication with the shut off valve 603, and first servovalve 604. In various embodiments, the pressure sensor 608 may be configured to be outside the housing 602, and not coupled to the housing 602, but remain in fluid communication with the shut off valve 603, and first servovalve 604.

In various embodiments, a return port 612 is coupled to the housing 602 and is configured to return the pressurized fluid to a fluid reservoir. In various embodiments, the return port 612 is in fluid communication with the shut off valve 603, the first servovalve 604 and a solenoid 615. The return port may be configured to output any return of the pressurized fluid from the shut off valve 603, the first servovalve 604 and the solenoid 615.

In various embodiments, a solenoid port 614 is coupled to the housing 602. The solenoid 615 may be coupled to the housing 602. In various embodiments, the solenoid 615 is in fluid communication with the supply port 610, the shut off valve 603, and the return port 612. The solenoid 615 may also be configured to receive the pressurized fluid from the supply port. In various embodiments, the solenoid 615 may also supply the pressurized fluid to the shut off valve 603. The solenoid 615 may supply a small amount of the pressurized fluid to the shut off valve 603. In various embodiments, the solenoid 615 only provides the small amount of the pressurized fluid to the shut off valve 603 in order to open the shut off valve 603.

In various embodiments, the solenoid is in electronic communication with the BCU 25. The solenoid 615 is configured to receive the brake signal from the BCU 25. The solenoid 615 may comprise an open position and a closed position. The solenoid 615 may be configured to supply the pressurized fluid to the shut off valve 603 in response to the solenoid 615 being in the open position. In various embodiments, solenoid 615 is configured to prevent the supply of pressurized fluid to the shut off valve in response to the solenoid being in the closed position. In various embodiments, the solenoid 615 remains in the closed position and transitions from the closed position to the open position upon receiving the brake signal from the BCU 25.

In various embodiments, the shut off valve 603 comprises a shut off valve open position and a shut off valve closed position. When in the shut off valve open position, the shut off valve 603 may be configured to supply the pressurized fluid to the first servovalve 604. When in the shut off valve closed position, the shut off valve 603 may be configured to prevent supply of the pressurized fluid to the first servovalve 604. In various embodiments, the shut off valve 603 remains in the shut off valve closed position and only transitions to the shut off valve open position in response to receiving the pressurized fluid from the solenoid 615.

In various embodiments, the first servovalve 604 is in fluid communication with a first brake port 618 coupled to the housing 602. The first servovalve 604 may be configured to supply the pressurized fluid to the first brake port 616.

In various embodiments, a check valve 620 is disposed within the housing 602 and may be in fluid communication with the shut off valve 603, the first servovalve 604, the solenoid 615 and the return port 612. The check valve 620 may be upstream of the return port 612 and downstream of the shut off valve 603, the first servovalve 604 and the solenoid 615. In various embodiments, an inlet filter 622 is disposed within the housing 602 and may be in fluid communication with the shut off valve 603, the solenoid 615 and the supply port 610. The inlet filter 622 may be upstream of the shut off valve 603 and the solenoid 615, and downstream of the supply port 610.

While the disclosure is described with reference to exemplary embodiments, it will be understood by those skilled in the art that various changes may be made, and equivalents may be substituted without departing from the spirit and scope of the disclosure. In addition, different modifications may be made to adapt the teachings of the disclosure to particular situations or materials, without departing from the essential scope thereof. The disclosure is thus not limited to the particular examples disclosed herein, but includes all embodiments falling within the scope of the appended claims.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of a, b, or c" is used in the claims, it is intended that the phrase be interpreted to mean that a alone may be present in an embodiment, b alone may be present in an embodiment, c alone may be present in an embodiment, or that any combination of the elements a, b and c may be present in a single embodiment; for example, a and b, a and c, b and c, or a and b and c. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A brake control valve module, comprising:
   a housing;
   a shut off valve disposed within the housing;
   a first servovalve coupled to the housing;
   a pressure sensor disposed within the housing and in fluid communication with the shut off valve and the first servovalve;
   a supply port coupled to the housing, the supply port configured to supply pressurized fluid to a fluid plumbing system;
   a return port coupled to the housing, the return port configured to return the pressurized fluid to a fluid supply, wherein the return port is in fluid communication with the shut off valve and the first servovalve;
   a solenoid port disposed on the housing;
   a solenoid coupled to the housing at the solenoid port, the solenoid configured to receive the pressurized fluid from the supply port and is configured to supply the pressurized fluid to the shut off valve;
   a check valve disposed within the housing, in fluid communication downstream of the shut off valve, the first servovalve, and the solenoid, and upstream of the return port; and
   an inlet filter disposed within the housing, in fluid communication upstream of the shut off valve and the solenoid and downstream of the supply port.

2. The brake control valve module of claim 1, wherein the shut off valve is configured to supply the pressurized fluid to the first servovalve in response to the shut off valve receiving the pressurized fluid from the solenoid.

3. The brake control valve module of claim 2, wherein the first servovalve is configured to supply the pressurized fluid to a first brake port coupled to the housing.

4. The brake control valve module of claim 1, wherein the pressure sensor comprises at least one of a pressure transducer or a pressure switch.

5. The brake control valve module of claim 1, wherein the pressure sensor is configured to send a pressure signal to a brake control unit.

6. The brake control valve module of claim 1, wherein the pressure sensor is configured to measure a pressure of the pressurized fluid downstream of the shut off valve and upstream of the first servovalve.

7. The brake control valve module of claim 1, further comprising:
   a second servovalve coupled to the housing,
   wherein the shut off valve is configured to supply the pressurized fluid to the second servovalve in response to the shut off valve receiving the pressurized fluid from the solenoid, and
   wherein the second servovalve is configured to supply the pressurized fluid to a second brake port coupled to the housing.

8. The brake control valve module of claim 1, wherein:
   the solenoid comprises an open position, wherein the solenoid is configured to supply the pressurized fluid to the shut off valve in response to the solenoid being in the open position,
   the solenoid comprises a closed position, wherein the solenoid is configured not to supply the pressurized fluid to the shut off valve in response to the solenoid being in the closed position,
   the solenoid is configured to remain in the closed position, and
   the solenoid is configured to transition from the closed position to the open position in response to a brake signal from a brake control unit.

9. A method of detecting a shut off valve failure, comprising:
   receiving, by a controller, a pressure signal from a pressure sensor in a brake control valve module and a brake signal from a brake input device,
   wherein the brake control valve module comprises:
     a housing,
     a shut off valve disposed within the housing,
     a first servovalve coupled to the housing,
     the pressure sensor disposed within the housing in fluid communication with the shut off valve and the first servovalve,
     a supply port coupled to the housing, the supply port configured to supply pressurized fluid to a fluid plumbing system,
     a return port coupled to the housing, the return port configured to return the pressurized fluid to a fluid supply, wherein the return port is in fluid communication with the shut off valve and the first servovalve,
     a solenoid port disposed on the housing,
     a solenoid coupled to the housing at the solenoid port, the solenoid configured to receive the pressurized fluid from the supply port and is configured to supply the pressurized fluid to the shut off valve,
     a check valve disposed within the housing, in fluid communication downstream of the shut off valve, the first servovalve, and the solenoid, and upstream of the return port, and
     an inlet filter is disposed within the housing, in fluid communication upstream of the shut off valve and the solenoid and downstream of the supply port;
   determining, by the controller, the shut off valve failure in the brake control valve module in response to the pressure signal being greater than a pressure threshold and the controller not receiving the brake signal for a threshold period; and
   sending, by the controller, an alert signal to an emergency notification system in response to detection of the shut off valve failure.

10. The method of claim 9 wherein the pressure sensor comprises at least one of a pressure transducer or a pressure switch.

11. The method of claim 10 wherein the pressure sensor is configured to transmit the pressure signal to the controller every 2.5 milliseconds to 100 milliseconds, and wherein the brake input device is configured to transmit the brake signal in response to the brake input device being engaged.

12. The method of claim 11, wherein the threshold period is between 100 milliseconds and 2 seconds.

13. The method of claim 12, wherein the pressure threshold is a range between 1000 kPa to 2000 kPa.

14. A brake control system, comprising:
a brake control valve module, comprising:
a housing,
a shut off valve disposed within the housing,
a first servovalve coupled to the housing, and
a pressure sensor disposed within the housing in fluid communication with the shut off valve and the first servovalve;
a fluid supply configured to supply a pressurized fluid to the brake control valve module;
a supply port coupled to the housing, the supply port configured to supply the pressurized fluid to a fluid plumbing system;
a return port coupled to the housing, the return port configured to return the pressurized fluid to the fluid supply, wherein the return port is in fluid communication with the shut off valve and the first servovalve;
a solenoid port disposed on the housing;
a solenoid coupled to the housing at the solenoid port, the solenoid configured to receive the pressurized fluid from the supply port and is configured to supply the pressurized fluid to the shut off valve;
a check valve disposed within the housing, in fluid communication downstream of the shut off valve, the first servovalve, and the solenoid, and upstream of the return port;
an inlet filter disposed within the housing, in fluid communication upstream of the shut off valve and the solenoid and downstream of the supply port; and
a brake control unit configured to receive a pressure signal from the pressure sensor.

15. The brake control system of claim 14, wherein the pressure sensor is configured to measure a pressure of the pressurized fluid downstream of the shut off valve and upstream of the first servovalve.

16. The brake control system of claim 15, wherein the pressure sensor comprises at least one of a pressure transducer or a pressure switch.

* * * * *